United States Patent
Bridges et al.

[11] 3,902,113
[45] Aug. 26, 1975

[54] MEANS AND METHOD FOR INDUCING ELECTRICAL POLARIZATION OF AN EARTH FORMATION AND FOR MEASURING THE INDUCED ELECTRICAL POLARIZATION AND FOR PROVIDING SPONTANEOUS POTENTIAL CORRECTION

[75] Inventors: James R. Bridges; Donald J. Dowling, both of Houston, Tex.

[73] Assignee: Texaco Inc., New York, N.Y.

[22] Filed: Mar. 14, 1974

[21] Appl. No.: 450,958

[52] U.S. Cl. .................................................. 324/10
[51] Int. Cl. .................................................. G01v 3/18
[58] Field of Search ........................... 321/1, 8, 9, 10

[56] References Cited
UNITED STATES PATENTS

| | | | |
|---|---|---|---|
| 2,291,692 | 8/1942 | Cloud | 324/8 |
| 2,728,047 | 12/1955 | Doll | 324/1 |
| 2,937,333 | 5/1960 | Boucherot | 324/1 |
| 2,988,691 | 6/1961 | McAlister et al. | 324/1 |
| 3,219,921 | 11/1965 | Bricaud | 324/1 |
| 3,254,297 | 5/1966 | McAlister et al. | 324/1 |
| 3,402,348 | 9/1968 | Hoehn, Jr. et al. | 324/8 |
| 3,810,000 | 5/1974 | Aspinall et al. | 324/1 |

*Primary Examiner*—Gerard R. Strecker
*Attorney, Agent, or Firm*—T. H. Whaley; C. G. Ries; Ronald G. Gillespie

[57] ABSTRACT

Apparatus at two different time intervals in each cycle of operation induces electrical polarization of an earth formation in a manner that each polarization is in an opposite direction to the polarization preceding and succeeding it. A measuring circuit controlled by timing logic measures the induced electrical potential at two different locations during two other time intervals in each cycle of operation. A difference amplifier provides a potential difference signal in accordance with the measured potentials. During one of the two measuring time intervals of each cycle, the difference signal is inverted. The signal which is not inverted and the inverted difference signal are integrated to provide an output to recording means to record the measured decay potentional difference.

15 Claims, 12 Drawing Figures

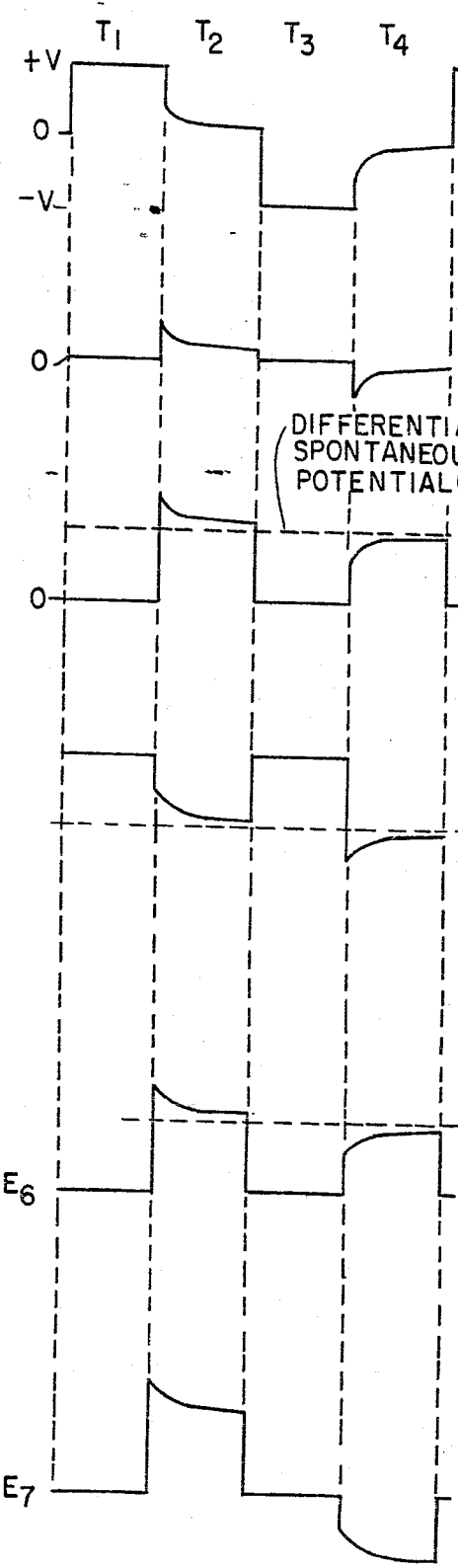

3,902,113

MEANS AND METHOD FOR INDUCING ELECTRICAL POLARIZATION OF AN EARTH FORMATION AND FOR MEASURING THE INDUCED ELECTRICAL POLARIZATION AND FOR PROVIDING SPONTANEOUS POTENTIAL CORRECTION

BACKGROUND OF THE INVENTION

Field of the Invention

The present invention corresponds to measuring systems in general and, more particularly, to a system for measuring induced electrical polarization as it decays.

SUMMARY OF THE INVENTION

A logging tool includes circuitry for inducing electrical polarization of an earth's formation and for providing an output corresponding to the induced electrical polarization. The circuitry includes a control network which controls the operation of the circuitry so that there are at least four time intervals in each cycle of operation. The circuitry also includes a network which induces electrical polarization of the earth's formation of one polarity during a first time interval of each cycle and for an opposite polarity during a third time interval of each cycle in response to the control network. A measuring network measures the induced electrical potential and provides a measurement signal during a second and a fourth time interval of each cycle corresponding to the measurement induced electrical polarization. The measurement signal is invented during one time interval of each cycle, the time interval being either the second or fourth time interval. An integrating circuit integrates the measurement signal during the time intervals it is not being inverted and integrates the inverted measurement signal during the time intervals the measurement signal is being inverted to provide an output corresponding to the induced electrical polarization.

The objects and advantages of the invention will appear hereafter from consideration of the detailed description which follows, taken together with the accompanying drawings wherein one embodiment of the invention is illustrated by way of example. It is to be expressly understood, however, that the drawings are for illustration purposes only, and are not to be construed as defining the limits of the invention.

DESCRIPTION OF THE DRAWINGS

FIGS. 1 through 4 are diagrammatic representations of various wave forms relating to the induction of electrical polarization of an earth formation and to the measurement of the induced electrical polarization.

FIGS. 6A through 6E are graphic representations of timing pulses and control pulses occurring during operation of the apparatus shown in FIG. 5.

FIGS. 7 and 8 are graphic representations of the output of the differential amplifier and the summing means, respectively, shown in FIG. 5.

DESCRIPTION OF THE INVENTION

Figure 5:
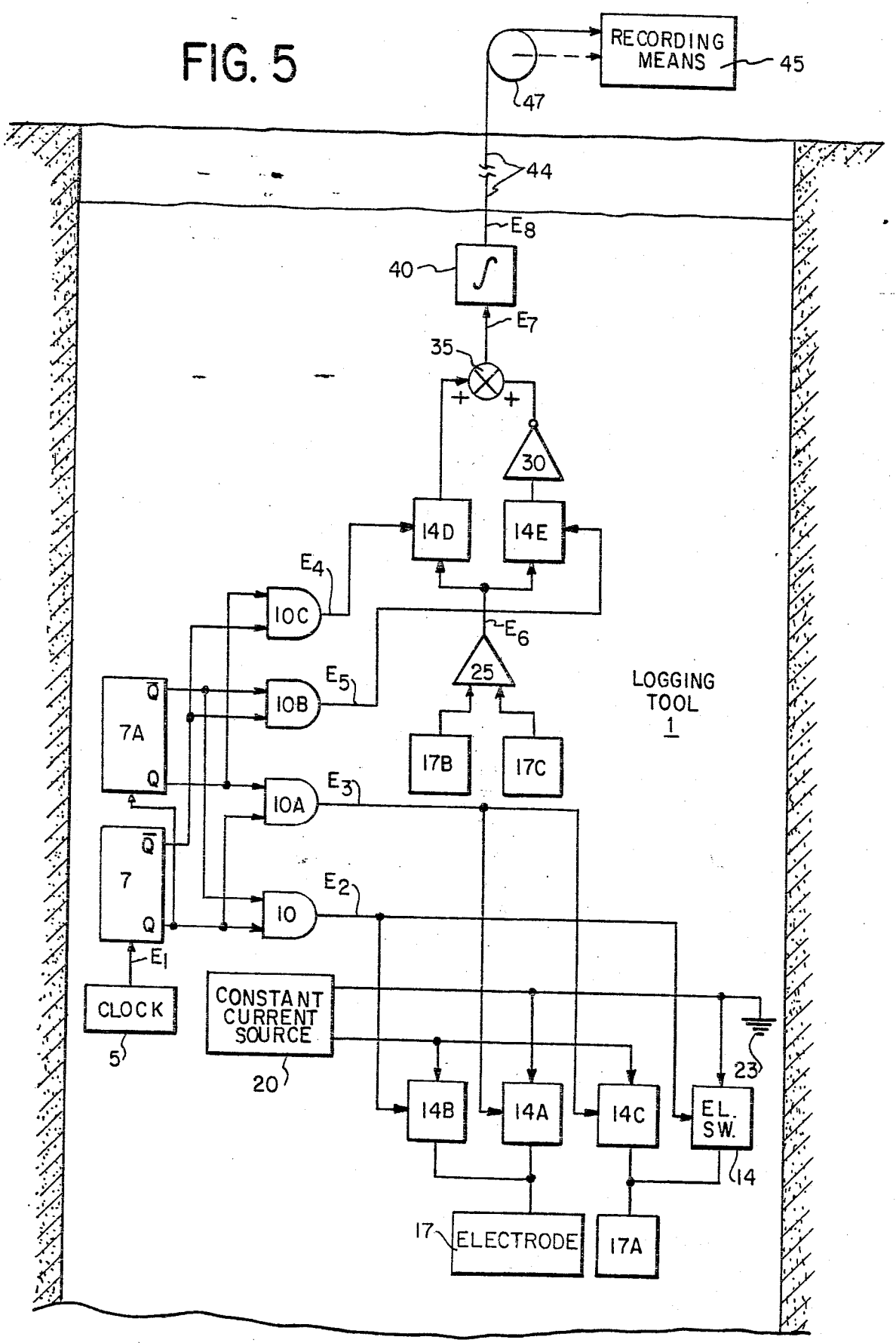
FIG. 5 is a simplified block diagram of a system, constructed in accordance with the present invention, for inducing electrical polarization of an earth formation and for measuring the induced electrical polarization.

Induced electrical polarization is used to measure the electrical energy storage capacity of different earth formations. A pulse transit induced electrical polarization logging system measures the decay potentials between two points in the earth formations after a charging potential has been applied to the formation. FIG. 1 illustrates a typical pulse transit potential wave shape. During time period $T_1$, a positive potential is applied to the earth formations. The potential field is then interrupted and the induced electrical polarization decay voltage is measured during time period $T_2$. A negative charging potential is applied during time period $T_3$ and the induced electrical polarization decay voltage is measured during time period $T_4$. The polarity of the charging potential is usually reversed each time it is applied to the earth formations to reduce the spontaneous induced polarization of the logging electrodes. The average absolute magnitude of the induced electrical polarization decay voltage is recorded in the format of a standard electrical well log. Normally the two measuring electrodes are connected to inputs of a differential amplifier. The output voltage of the differential amplifier is gated with a switch so that only the induced electrical polarization voltage is sampled during time periods $T_2$ and $T_4$. When both measuring electrodes are located in zones of equal spontaneous potential, the gated induced electrical potential voltage may appear as illustrated in FIG. 2.

A typical method used to measure the average absolute induced electrical polarization voltage is to rectify the gated induced electrical polarization voltage and then integrate this voltage over time period $T_1$ plus $T_2$ plus $T_3$ plus $T_4$. When the two measuring electrodes are not at the same spontaneous potential, the differential amplifier senses the differential spontaneous potential and the gated induced electrical polarization voltages may appear as in FIG. 3 or FIG. 4. A voltage having the wave shape shown in FIGS. 3 or 4 causes an error in the recorded induced electrical polarization voltage. One method of correcting for this error is to provide a correction circuit which will sense any change in differential spontaneous potential and automatically apply a correcting voltage of equal magnitude and opposite polarity to the measuring circuit. Such automatic correction circuits use a capacitor for memory and the response time of the circuit is limited by the corresponding time constant. The apparatus and method of the present invention eliminates the time constant of the automatic correction circuit.

Referring now to FIG. 5, there is shown a portion of a logging tool 1 containing circuitry for inducing polarization of the earth formation and circuitry for measuring the induced polarization with correction for the spontaneous potential. The correction for the spontaneous potential is obtained by inverting the measurement signal, algebraically summing the measurement signal and the inverted measurement signal and integrating the sum signal. Logging tool 1 includes a clock 5 providing timing pulses $E_1$, shown in FIG. 6A, to series connected flip-flops 7, 7A so that they form a counter. Elements having a number with a suffix are of the same type as elements having the same number without a suffix. Each flip-flop provides a Q and $\overline{Q}$ outputs. In the set state, the $\overline{Q}$ output is a high level direct current voltage while the Q output is a low level direct current voltage. When in a clear state, the level of the Q and $\overline{Q}$ outputs are reversed. The outputs of flip-flops 7, 7A are connected to AND gates 10, 10A, 10B and 10C which generate control pulses $E_2$, $E_3$, $E_4$ and $E_5$ in accordance with the outputs from flip-flops 7, 7A, as shown in FIGS. 6B, 6C, 6D, and 6E, respectively.

AND gates 10, 10A control electronic switches 14 through 14C to connect electrodes 17, 17A to a constant current source 20 and a ground 23 in various combinations as hereinafter explained. Thus a pulse $E_2$ simultaneously activates switches 14 and 14B to connect electrode 17A to ground 23 and electrode 17 to the constant current source 20 so that there is a closed circuit provided through the earth's formation thereby charging the earth formation in one polarity direction. None of the switches 14 though 14C are activated during pulse $E_4$. Upon the termination of pulse $E_4$, pulse $E_3$ starts and pulse $E_3$ activates switches 14A and 14C. Switch 14C applies current from current source 20 to electrode 17A while switch 14A connects electrode 17 to ground 23, so that the charging current is now flowing in an opposite direction thereby charging the earth formation in an opposite polarity direction.

The measuring circuit includes a pair of measuring electrodes 17B and 17C whose outputs are applied to a differential amplifier 25 providing a signal $E_6$, shown in FIG. 7, to switches 14D and 14E. Switches 14D and 14E are controlled by the outputs of AND gates 10C and 10B, respectively. The output from switch 14E is connected to a unity gain inverting amplifier 30. Summing means 35 sums the outputs from switch 14D and amplifier 30 to provide a signal $E_7$ to an integrator 40. Integrator 40 provides signal $E_8$, an average D.C. voltage, due to the operation of the measurement circuit as hereinafter explained. Electrodes 17B, 17C measure the induced electrical polarization decayed potentials sensed by electrodes 17B, 17C. During time period $T_4$ during which pulse $E_5$ occurs, switch 14E is activated to pass signal $E_6$ to inverting amplifier 30 where it is inverted and applied to summing means 35. Since the output from switch 14D is essentially zero, summing means 35 provides the inverted signal $E_6$ to integrator 40 which integrates it to provide signal $E_8$.

During the occurrence of pulse $E_3$, both switches 14D and 14E are rendered non-conductive, so that signal $E_7$ has a zero value. During the occurrence of pulse $E_4$, switch 14D is rendered conductive to pass signal $E_6$ to summing means 35. Since switch 14E remains non-conductive, the output from inverting amplifier 30 is zero so that summing means 35 essentially passes signal $E_6$ as $E_7$ to integrator 40 which integrates signal $E_7$ to provide signal $E_8$. Signal $E_8$ is transmitted uphole by way of a conventional type cable 44 to recording means 45. A depth sensing device 47 provides a signal to recording means 45 for driving recording means 45 so that the measured stored electrical energy may be correlated to depth.

Although the system of the present invention has been shown as having all of the electronic circuitry, with the exception of the recording means and the depth sensing device, as being located in logging tool 1, it would be obvious to one possessing but ordinary skill in the art, to locate all of the electronic circuitry, save for electrodes 17 through 17C, at the surface. Under such an arrangement the constant current and ground potential are transmitted downhole to electrodes 17, 17A while the outputs from electrodes 17B and 17C are transmitted uphole.

The system of the present invention as hereinbefore described induces electrical polarization of an earth formation and measures the induced electrical polarization. In the measuring of the induced electrical polarization the measurement occurs during two quarters of each cycle and the measured spontaneous differential potential is inverted every other measured quarter-cycle. The inverted and non-inverted measured differential potential is integrated and recorded.

What is claimed is:

1. Apparatus adapted to be passed through a borehole in an earth formation for inducing electrical polarization of the earth formation and for providing an output corresponding to the induced electrical polarization, comprising means for controlling the apparatus so that each cycle of operation covers at least four time intervals, means connected to the control means for inducing electrical polarization of the earth's formation of one polarity during a first time interval of each cycle and of an opposite polarity during a third time interval of each cycle, means for measuring the induced electrical potential and providing a measurement signal during a second and a fourth time interval of each cycle corresponding to the measured induced electrical polarization, means connected to the measuring means for inverting the measurement signal during one time interval of each cycle, the inverting time interval being either the second or fourth time interval, and output means connected to the measuring means and to the inverting means for integrating the measurement signal during those time intervals when the measurement signal is not being inverted and for integrating the inverted measurement signal during those time intervals when the measurement signal is being inverted to provide the output corresponding to the induced electrical polarization of the earth formation.

2. Apparatus as described in claim 1 in which the measuring means includes a pair of electrodes spaced a predetermined distance apart, each electrode sensing an electrical potential of the earth's formation and providing a signal corresponding thereto, means connected to the electrodes for providing a signal corresponding to the difference of the sensed potentials as the measurement signal, and first switching means connected to the difference signal means to the control means, to the inverting means and to the integrating means, and controlled by the control means for passing the measurement signal during the non-inverting time interval to the integrating means and for passing the inverted measurement signal from the inverting means to the integrating means during the inverting time interval of each cycle; and the integrating means includes summing means connected to the switching means for summing the measurement signal and the inverted measurement signal to provide an output, and an integrating circuit means for integrating the output from the summing means to provide the output corresponding to the measured induced electrical polarization.

3. Apparatus as described in claim 2 in which the inducing means includes a second pair of electrodes, a source of a constant electrical current, and second switching means connected to the control means, to the second pair of electrodes, to the constant current source and to ground and controlled by the control means to connect one electrode of the second pair of electrodes to the constant current source and the other electrode of the second pair of electrodes to ground during the first time interval of each cycle and to connect the other electrode of the second pair of electrodes to the constant current source and the one electrode of the second pair of electrodes to ground during the third time interval of each cycle of operation.

4. Apparatus as described in claim 3 in which the first mentioned switching means includes a first switch connecting the measurement signal means to the summing means and controlled by the control means which is rendered conductive by a pulse from the control means so as to pass the measurement signal from the measurement signal means to the summing means and rendered non-conductive by the absence of a pulse from the control means so as to block the measurement signal, and a second switch connecting the inverting means to the summing means which is rendered conductive by a pulse from the control means so as to pass the inverted measurement signal from the inverting means to the summing means and to be rendered non-conductive by the absence of a pulse from the control means so as to block the inverted measurement signal from the inverting means.

5. Apparatus as described in claim 4 in which the control means includes a source of timing pulses, a manual operative switch receiving a direct current voltage, an AND gate connected to the timing pulse source and to the manual switch so that when an operator activates the manual switch the AND gate passes the timing pulses, a counter connected to the AND gate counts the passed timing pulses, and decoding means connected to the counter and to the switches for providing the pulses to the switches in accordance with the count in the counter.

6. Apparatus as described in claim 5 in which the control means provides a pulse to the third and fourth switches during the first time interval of each cycle, a pulse to the fifth and sixth switches during the fourth time interval of each cycle, a pulse to the first switch during the second time interval of each cycle, and a pulse to the second switch during the fourth time interval of each cycle.

7. A method for inducing electrical polarization of an earth's formation and for providing an output corresponding to the induced electrical polarization which comprises the following steps of: generating in a borehole in the earth formation an electric current flowing in one direction during a first time interval and in an opposite direction during a third time interval so as to induce electrical polarization of the earth formation of opposite polarity during the first and third time intervals, measuring the induced electrical polarization, providing a measurement signal during a second and a fourth time interval corresponding to the measured induced electrical polarization, inverting the measurement signal during one time interval, either the second or the fourth time interval, and integrating the measurement signal during the time interval the measurement signal is not being inverted and the inverted measurement signal during the time interval the measurement signal is being inverted to provide the output corresponding to the induced electrical polarization.

8. A method as described in claim 7 further comprising repeating all of the steps on a periodic basis.

9. A method as described in claim 8 further comprising the step of recording the output corresponding to the induced electrical polarization.

10. A system for inducing electrical polarization of an earth formation and for providing a record of the induced electrical polarization of the earth formation, comprising a logging tool adapted to be passed through a borehole in the earth formation including two pairs of electrodes; apparatus on the surface adjacent the borehole including means for controlling the system so that each cycle of operation covers at least four time intervals, means connected to the control means for providing an electrical current of one polarity during a first time interval of each cycle and of an opposite polarity during a third time interval of each cycle, means for measuring an induced electrical potential and providing a measurement signal during a second and a fourth time interval of each cycle, corresponding to the measured induced electrical polarization, means connected to the measuring means for inverting the measurement signal during one time interval of each cycle, the inverting time interval being either the second or fourth time interval, integrating means connected to the measuring means for integrating the measurement signal during the time intervals when the measurement signal is not being integrated and for integrating the inverted measurement signal during those time intervals when the measurement signal is being inverted to provide an integrated signal corresponding to the induced electrical polarization of the earth formation, and means for recording the integrated signal; and transmission means connecting the logging tool to the surface apparatus including first conductive means for electrically connecting one pair of electrodes to the electrical current means, and second conductive means for electrically connecting the other pair of electrodes to the measuring means.

11. A system as defined in claim 10 in which the electrodes of the other pair of electrodes are spaced a predetermined distance apart, each electrode sensing an electrical potential of the earth's formation and providing a signal corresponding thereto, and the measuring means includes means electrically connected to the electrodes by the second conductive means for providing a signal corresponding to the difference of the sensed potentials as the measurement signal, and first switching means connected to the difference signal means to the control means, to the inverting means and to the integrating means, and controlled by the control means for passing the measurement signal during the non-inverting time interval to the integrating means and for passing the inverted measurement signal from the inverting means to the integrating means during the inverting time interval of each cycle; and the integrating means includes summing means connected to the switching means for summing the measurement signal and the inverted measurement signal to provide an output, and an integrating circuit means for integrating the output from the summing means to provide the integrated signal corresponding to the measured induced electrical polarization.

12. A system as described in claim 11 in which the constant current means includes a source of a constant electrical current, and second switching means connected to the control means, to the one pair of electrodes, to the constant current source and to ground and controlled by the control means to connect one electrode of the one pair of electrodes to the constant current source and the other electrode of the one pair of electrodes to ground during the first time interval of each cycle and to connect the other electrode of the one pair of electrodes to the constant current source and the one electrode of the one pair of electrodes to ground during the third time interval of each cyclor of operation.

13. A system as described in claim 12 in which the first switching means includes a first switch connecting the measurement signal means to the summing means and controlled by the control means which is rendered conductive by a pulse from the control means so as to pass the measurement signal from the measurement signal means to the summing means and rendered non-conductive by the absence of a pulse from the control means so as to block the measurement signal, and a second switch connecting the inverting means to the summing means which is rendered conductive by a pulse from the control means so as to pass the inverted measurement signal from the inverting means to the summing means ans to be rendered non-conductive by the absence of a pulse from the control means so as to block the inverted measurement signal from the inverting means.

14. A system as described in claim 13 in which the control means includes a source of timing pulses, a manual operative switch receiving a direct current voltage, an AND gate connected to the timing pulse source and to the manual switch so that when an operator activates the manual switch the AND gate passes the timing pulses, a counter connected to the AND gate and counting the passed timing pulses, and decoding means connected to the counter and to the switches for providing the pulses to the switches for providing the pulses to the switches in accordance with the count in the counter.

15. A system as described in claim 14 in which the control means provides a pulse to the third and fourth switches during the first time interval of each cycle, a pulse to the fifth and sixth switches during the fourth time interval of each cycle, a pulse to the first switch during the second time interval of each cycle, and a pulse to the second switch during the fourth time interval of each cycle.

* * * * *